United States Patent [19]

Strong

[11] 3,929,961
[45] Dec. 30, 1975

[54] TREATMENT OF IRRADIATED NUCLEAR FUEL ELEMENTS

[75] Inventor: Robert Edmund Strong, Bootle, England

[73] Assignee: United Kingdom Atomic Energy Authority, London, England

[22] Filed: Aug. 2, 1973

[21] Appl. No.: 384,837

Related U.S. Application Data

[63] Continuation of Ser. No. 111,096, Jan. 29, 1971, abandoned.

[30] Foreign Application Priority Data

Feb. 3, 1970  United Kingdom................. 5227/70

[52] U.S. Cl. .................... 423/4; 75/43; 75/65 ZM; 219/10.43; 219/10.47
[51] Int. Cl.² .......................................... C01G 56/00
[58] Field of Search ................ 423/4; 148/127, 132; 75/43, 65 ZM; 219/10.43, 10.57

[56] References Cited

UNITED STATES PATENTS

| | | | |
|---|---|---|---|
| 3,089,751 | 5/1963 | Beaver et al. | 423/4 |
| 3,316,065 | 4/1967 | Baertschi et al. | 423/4 |
| 3,709,999 | 1/1973 | Bates et al. | 219/10.57 X |

FOREIGN PATENTS OR APPLICATIONS

| | | | |
|---|---|---|---|
| 1,097,597 | 1/1968 | United Kingdom | 423/4 |
| 1,165,869 | 10/1969 | United Kingdom | 423/4 |

*Primary Examiner*—Benjamin R. Padgett
*Assistant Examiner*—R. E. Schafer
*Attorney, Agent, or Firm*—Larson, Taylor and Hinds

[57] ABSTRACT

The treatment of an elongate irradiated nuclear reactor fuel element comprising ceramic nuclear fuel within a metal sheath in which the sheath is ruptured by subjecting the fuel element to local induction heating. Fuel exposed by rupture of the sheath may be dissolved out.

3 Claims, No Drawings

TREATMENT OF IRRADIATED NUCLEAR FUEL ELEMENTS

This is a continuation of application Ser. No. 111,096, filed Jan. 29, 1971, now abandoned.

BACKGROUND OF THE INVENTION

This invention relates to the treatment of irradiated nuclear reactor fuel elements of the kind comprising ceramic nuclear fuel enclosed in a metal sheath.

Prior to the processing of irradiated ceramic nuclear fuel to separate fission products from the fuel material it is generally preferred to separate the fuel material from its sheath. Mechanical means are usually selected for this purpose because storage or disposal of the contaminated sheath material is easier if it is retained in solid form but with oxide fuel, for example, difficulties can arise because of the frangible nature of the fuel and the small diameter and thinness of the sheaths used. It is therefore present practice to shear such fuel elements into short lengths mechanically and to dissolve out the fuel material preferentially.

SUMMARY OF THE INVENTION

According to the present invention in the treatment of an elongate irradiated nuclear reactor fuel element comprising ceramic nuclear fuel within a metal sheath the sheath is ruptured by subjecting the fuel element to local induction heating.

DESCRIPTION OF THE PREFERRED EMBODIMENT

Rupture is observed to occur when a portion of a fuel element disposed lengthwise within an induction coil is exposed to a radio-frequency magnetic field whereby the sheath of the fuel element is heated to its melting temperature, and the fuel element is moved axially relative to the induction coil. The mechanism appears to be that a crack is first generated as a result of local melting and that then the crack is extended as heating continues by the relative axial movement of the element and the surrounding induction coil.

Rupture of a sheath makes it possible to dissolve out the fuel material enclosed by the sheath without shearing the element into short lengths. Stainless steel sheaths enclosing oxide fuel material have been ruptured by suspending them within an energised coil fed with radio frequency power. A frequency between about 0.1 – 1.0 MHz has been found suitable, heating being confined to short lengths of sheath (about 5 cm long) by the use of current concentrators. A feed rate of 2.5 cm per second through the coil produces satisfactory results. It is possible to rupture fuel elements arranged in clusters.

I claim:

1. A method of treating an elongate irradiated nuclear fuel element comprising ceramic oxide nuclear fuel enclosed within a stainless steel metal sheath for removal of the fuel material from the sheath comprising disposing the elongate fuel element with a portion thereof within an induction coil, subjecting the induction coil to a radio frequency magnetic field to induce local induction heating of the metal sheath sufficient to raise the temperature of said metal sheath at the portion thereof within said coil to its melting temperature to effect local melting therein, and moving the fuel element axially relative to said induction coil while continuing heating to rupture said metal sheath.

2. The treatment of an elongate irradiated nuclear reactor fuel element as claimed in claim 1 wherein the fuel element is one of several arranged in a cluster.

3. The treatment of an elongate irradiated nuclear reactor fuel element as claimed in claim 1 including the further step of dissolving out the nuclear fuel from the ruptured sheath.

* * * * *